(12) United States Patent
Velarde et al.

(10) Patent No.: US 8,947,555 B2
(45) Date of Patent: Feb. 3, 2015

(54) WHITE BALANCE OPTIMIZATION WITH HIGH DYNAMIC RANGE IMAGES

(75) Inventors: Ruben M. Velarde, Chula Vista, CA (US); Kalin M. Atanassov, San Diego, CA (US); Bob R. Hung, Carlsbad, CA (US); Liang Liang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 13/088,936

(22) Filed: Apr. 18, 2011

(65) Prior Publication Data

US 2012/0262600 A1    Oct. 18, 2012

(51) Int. Cl.
*H04N 9/73* (2006.01)
*H04N 5/235* (2006.01)
*H04N 5/232* (2006.01)
*H04N 5/353* (2011.01)

(52) U.S. Cl.
CPC ......... *H04N 5/2355* (2013.01); *H04N 5/23254* (2013.01); *H04N 5/23267* (2013.01); *H04N 5/2353* (2013.01); *H04N 5/353* (2013.01); *H04N 9/735* (2013.01)
USPC ...................................................... 348/223.1

(58) Field of Classification Search
CPC ....... H04N 9/73–9/735; H04N 1/6077–1/6083
USPC .......................................... 348/233.1, 223.1
See application file for complete search history.

(56) References Cited

U.S. PATENT DOCUMENTS

| | | | | |
|---|---|---|---|---|
| 4,647,975 A | * | 3/1987 | Alston et al. | 348/222.1 |
| 5,589,880 A | * | 12/1996 | Tsukui | 348/229.1 |
| 6,177,958 B1 | | 1/2001 | Anderson | |
| 6,496,309 B1 | * | 12/2002 | Bliton et al. | 359/618 |
| 6,747,694 B1 | * | 6/2004 | Nishikawa et al. | 348/229.1 |
| 7,084,907 B2 | * | 8/2006 | Takeshita | 348/223.1 |
| 2005/0073529 A1 | * | 4/2005 | Gu | 345/589 |
| 2006/0262363 A1 | | 11/2006 | Henley | |
| 2008/0143844 A1 | * | 6/2008 | Innocent | 348/223.1 |
| 2008/0187235 A1 | | 8/2008 | Wakazono et al. | |
| 2008/0284872 A1 | | 11/2008 | Asoma | |
| 2009/0060315 A1 | | 3/2009 | Harris et al. | |
| 2009/0268963 A1 | | 10/2009 | Kang et al. | |

(Continued)

FOREIGN PATENT DOCUMENTS

| | | |
|---|---|---|
| EP | 1519570 A2 | 3/2005 |
| EP | 1545123 A1 | 6/2005 |
| EP | 1857975 A2 | 11/2007 |
| EP | 1868368 A1 | 12/2007 |

OTHER PUBLICATIONS

International Search Report and Written Opinion—PCT/US2012/034105—ISA/EPO—Jun. 29, 2012.

(Continued)

*Primary Examiner* — Sinh Tran
*Assistant Examiner* — Mark Monk
(74) *Attorney, Agent, or Firm* — James R. Gambale, Jr.

(57) ABSTRACT

Systems and methods to improve the white balance of a high dynamic range image are disclosed. In a particular embodiment, an imaging device includes a camera sensor and a processor, the processor configured to capture a lighter image and a darker image of a scene. The processor is then configured to white balance the lighter image based on the lighter regions of the image, and to white balance the darker image based on the darker regions of the image. The two images can then be combined to produce a final image.

28 Claims, 12 Drawing Sheets

(56) References Cited

U.S. PATENT DOCUMENTS

| | | | |
|---|---|---|---|
| 2010/0020221 A1* | 1/2010 | Tupman et al. | 348/333.01 |
| 2010/0209015 A1* | 8/2010 | Yu et al. | 382/270 |
| 2010/0231749 A1 | 9/2010 | Tatsuzawa et al. | |
| 2010/0271512 A1 | 10/2010 | Garten | |
| 2011/0050950 A1 | 3/2011 | Nomura | |

OTHER PUBLICATIONS

Vuong, et al., "A New Auto Exposure and Auto White-Balance Algorithm to Detect High Dynamic Range Conditions Using CMOS Technology," Proceedings of the World Congress on Engineering and Computer Science, (2008), WCECS 2008, San Francisco, USA.

* cited by examiner

Exposure Optimized for Bright Region

WHITE BALANCE OPTIMIZATION WITH HIGH DYNAMIC RANGE IMAGES

FIELD

The present disclosure is generally related to white balancing of images. More particularly, the disclosure is related to systems and methods for white balancing high dynamic range images.

DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Digital signal processors (DSPs), image processors, and other processing devices are frequently used in portable personal computing devices that include digital cameras or that display image or video data captured by a digital camera. Such processing devices can be utilized to provide video and audio functions, and to process received data, such as captured image data.

A dynamic range of image data or video data captured by a digital camera indicates a ratio between a highest light level and a lowest light level that can be accurately resolved. A dynamic range of an image may vary with an exposure time of the image. In some cases, an image may be captured using two different preset exposure times. For example, a first exposure of a scene is taken, and then a second exposure of a scene at ½, ⅓, or ¼ of the exposure time is captured. The first exposure is used to provide the darker image areas, and the second, shorter exposure is used to provide the lighter image areas. The resulting two exposures are then combined to create a high dynamic range (HDR) image that has the proper exposure in the light and dark areas of the image. However, because this method uses fixed exposure times, it does not provide flexibility in the way that it captures light and dark areas since the second frame is always captured as a percentage of the exposure of the first frame.

Moreover, traditional white balance algorithms utilize a single set of white balance gains for a particular image. When these traditional techniques are applied to a high dynamic range image, the varying illumination of the two or more regions of the composite image can force an improper white balance and compromise the quality of the resulting image.

SUMMARY

The disclosed technique solves the problems described above. First, the exposure of each source image that will be combined to form the high dynamic range is optimized for a particular illuminant source. For example, one source image may be exposed so as to optimize for a dark region of a scene while a second source image's exposure parameters are optimized for a bright region of the scene. Such a technique eliminates the sub optimal exposures resulting from the fixed exposure bracketing described above with respect to some of the prior art.

Next, each source image is white balanced based on the region for which the exposure of that image was optimized. For example, if a first source image's exposure was optimized for its bright region, its white balance is based only on data from that same bright region. Similarly, an image with exposure optimized to capture a dark region is then white balanced based on that dark region. The white balance method of both images is further improved by consideration of the exposure parameters.

In a particular embodiment, a method of generating a high dynamic range digital image is disclosed that includes capturing a first image of a scene from a at least one sensor, wherein the first image has a bright region and a dark region, and wherein the first image is captured using a first exposure setting based on the bright region and wherein the white balance of the first image is determined by the bright region. The method includes capturing a second image of the scene from the at least one sensor, wherein the second image is captured using a second exposure setting based on the dark region, and wherein the white balance of the second image is determined by the dark region, and generating a high dynamic range digital image by combining the first image and second image.

In one embodiment of the method, the high dynamic range digital image is generated by combining the bright region of the first image with the dark region of the second image. In another embodiment, the white balance of the first region is also determined based on the first exposure setting and the white balance of the second region is also determined based on the second exposure setting. In some embodiments, the white balance is only applied to the bright region of the first image and to the dark region of the second image. In other embodiments, the first exposure setting is determined by creating a first luminance histogram of the first image, identifying a threshold from the first luminance histogram, and determining the bright region based on the threshold. In some embodiments, there is only one sensor. In other embodiments, there are at least two sensors, and the first image is captured by a first sensor and the second image is captured by a second sensor.

Other embodiments include an imaging device, comprising a camera sensor and a processor, the processor being configured to capture a first image of a scene from a at least one sensor, wherein the first image has a bright region and a dark region, and wherein the first image is captured using a first exposure setting based on the bright region and wherein the white balance of the first image is determined by the bright region. The processor is further configured to capture a second image of the scene from the at least one camera sensor, wherein the second image is captured using a second exposure setting based on the dark region and wherein the white balance of the second image is determined by the dark region. The processor is also configured to combine the first image and second image to produce a final image. The device of the embodiment also comprises a storage for storing the final image.

In some embodiments of the device, the first exposure setting is determined by creating a first luminance histogram of the first image, identifying a threshold from the first luminance histogram, and determining the bright region based on the threshold. In other embodiments, the device further comprises a second camera sensor, wherein the at least one sensor is two sensors, which comprise the first camera sensor and the second camera sensor. In some embodiments, the final image is a snapshot. The processor of the imaging device in some embodiments is further configured to determine a white balance of the first region based on the first exposure setting and to determine a white balance of the second region based on the second exposure setting. In some embodiments, the processor of the imaging device is configured to perform its steps repetitively. In some embodiments of the imaging device, the processor is further configured to determine a white balance of the first region based on the first exposure setting and to determine a white balance of the second region based on the second exposure setting. In other embodiments of the imaging device, the processor is further configured to determine a white balance of the first region based on the first exposure setting and to determine a white balance of the second region based on the second exposure setting.

Some embodiments comprise a non-transitory computer readable medium containing processor executable first instructions, operative to cause a processor to capture a first image of a scene from a at least one sensor, wherein the first image has a bright region and a dark region, and wherein the first image is captured using a first exposure setting based on the bright region and wherein the white balance of the first image is determined by the bright region, and capture a second image of the scene from the at least one sensor, wherein the second image is captured using a second exposure setting based on the dark region and wherein the white balance of the second image is determined by the dark region, and combine the first image and second image to produce a final image. In some embodiments, the first exposure setting is determined by creating a first luminance histogram of the first image, identifying a light threshold from the first luminance histogram, and determining the bright region based on the light threshold. Other embodiments also include second instructions operative to cause the processor to execute the first instructions repetitively.

One particular advantage provided by embodiments of improved white balance for high dynamic range image combining is a more accurate representation of true image illumination despite the varying exposure times used to compose the final image.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

FIG. 4a is taken with a short exposure and FIG. 4c is taken with a long exposure.

DETAILED DESCRIPTION

Implementations disclosed herein provide systems, methods and apparatus for white balancing a high dynamic range image. Particularly, the present embodiments contemplate capturing an image of a scene based on either a dark or bright region of the scene. The embodiments further contemplate white balancing the image based on either the bright or dark region. One skilled in the art will recognize that these embodiments may be implemented in hardware, software, firmware, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 1:
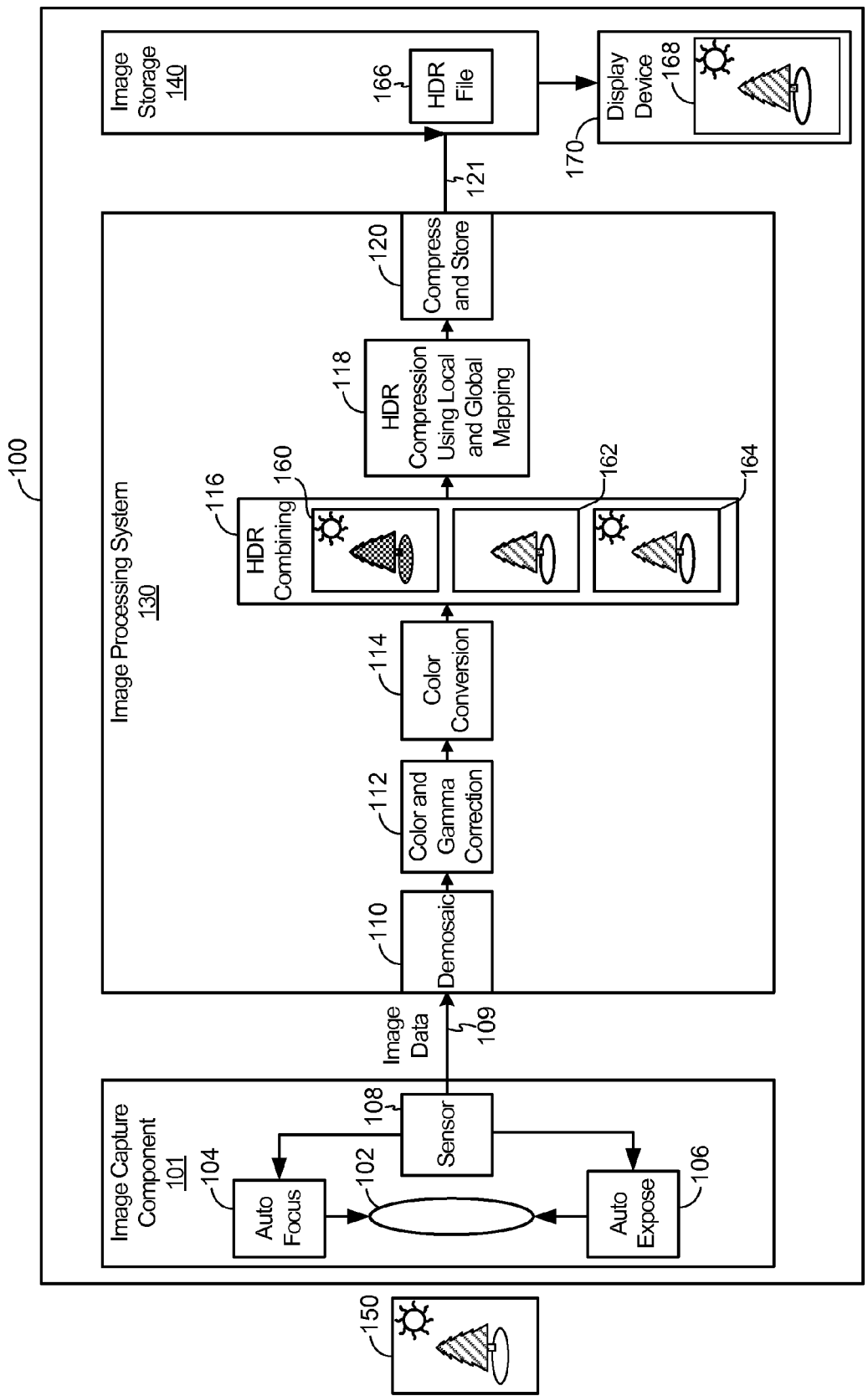
FIG. 1 is a block diagram of a particular illustrative embodiment of a system including an image processing system having a high dynamic range (HDR) combining module and a HDR compression module.

FIG. 1 is a block diagram of a particular illustrative embodiment of a system including an image processing system 130 having a high dynamic range (HDR) combining module 116 and a HDR compression module 118 using local and global mapping. The system 100 includes an image capture device 101 coupled to the image processing system 130. The image processing system 130 is coupled to an image storage device 140 and a display device 170. The image processing system 130 is configured to receive multiple sets of image data 109 from the image capture device 101 using different exposure times and to create a HDR image that is compatible with low dynamic range (LDR) transport, storage, and display mechanisms. Generally, the system 100 may be implemented in an electronic device that is configured to perform real-time image processing using relatively limited processing resources.

In a particular embodiment, the image capture device 101 is a camera, such as a video camera or a still camera. The image capture device 101 includes a lens 102 that is responsive to a focusing module 104 and to an exposure module 106. An image sensor 108 is coupled to receive light via the lens 102 and to generate the image data 109 in response to an image received via the lens 102. The focusing module 104 may be responsive to the sensor 108 and may be adapted to automatically control focusing of the lens 102. The exposure module 106 may also be responsive to the sensor 108 and may be adapted to control an exposure of the image and to vary exposures of multiple images to be combined into a HDR image. In a particular embodiment, the sensor 108 includes multiple detectors, or pixel wells, that are arranged so that adjacent detectors detect different colors of light. For example, received light may be filtered so that each detector receives red, green, or blue incoming light.

In some embodiments, particularly those implemented in mobile devices, it is common that the sensor contains the exposure time and gain settings. In these embodiments, the auto exposure module 106 will control not only the lens 102 for exposure and gain control, but also the sensor 108 for aperture and shutter control. Mechanical shutter and aperture control are not typically utilized in these devices except in higher end, more expensive embodiments.

The image capture device 101 is coupled to provide the image data 109 to the image processing system 130. The image processing system 130 includes a demosaic module 110 to perform a demosaic operation on image data 109 received from the sensor 108. A color and gamma correction module 112 is configured to perform color correction on the demosaiced image data and to generate gamma corrected image data. A color conversion module 114 is coupled to perform a color space conversion to the gamma corrected image data.

The image processing system 130 also includes a high dynamic range (HDR) combination module 116 and a HDR compression module using local and global mapping 118. The HDR combination module 116 is configured to combine a first low dynamic range image 160 that is captured using a shortened exposure time with a second low dynamic range image 162 that is captured using a longer exposure time. The low dynamic range (LDR) images 160 and 162 are combined to form a high dynamic range image 164. The HDR compression module using local and global mapping 118 is configured to compress the high dynamic range image 164 to a bit range compatible with a transport layer, such as a Joint Photographic Experts Group (JPEG) encoding, or a display device, such as the display device 170.

A compress and store module 120 is coupled to receive an output of the HDR compression module 118 and to store output data at the image storage device 140 as a compressed HDR file 166. For example, the compress and store module 120 may be configured to use JPEG encoding to encode the output of the HDR compression module 118 to be stored. The image storage device 140 may include any type of storage medium, such as one or more display buffers, registers, caches, flash memory elements, hard disks, any other storage device, or any combination thereof. The image storage device 140 may be accessible to the display device 170 so that the compressed HDR file 166 is retrievable for display as a HDR image 168 at the display device 170.

During operation, the system 100 may perform at least two image capture operations of a representative image 150. The image 150 includes a bright region, illustrated as the sun, as well as a dark region, illustrated as a shadow of a tree. The low dynamic range image 160 may include image data that is captured in response to a shortened exposure time at the sensor 108. The shortened exposure time may enable the sensor 108 to capture details within the brighter regions of the image 150. For example, the shortened exposure time may prevent saturation of sensor pixels in the region of the sun with a result that detail of darker areas such as the shadow of the tree may not be captured. On the other hand, the second low dynamic range image 162 may include image data captured by the sensor 108 at a longer exposure time, such as twice the exposure time of the image 160. The longer exposure time enables the sensor 108 to capture detail of the darker portions of the image 150 but causes pixels of the sensor 108 in the vicinity of the bright regions to saturate.

Within image processing system 130, the first LDR image 160 may provide contrast among the bright areas but not the darker areas, while the second LDR image 162 may provide contrast in the darker areas but the bright areas may appear washed out or indistinct. By combining the low dynamic range images 160 and 162 to create the high dynamic range image 164, the image processing system 130 enables image data to include details in the bright areas around the sun and also in the darker areas around the shadow of the tree. However, the resultant HDR image 164 may require substantially more information than may be supported by a transport layer, such as a JPEG layer, or by a display device, such as the display device 170. For example, where both of the low dynamic range images 160 and 162 may represent pixel luminance values as 8-bit values, e.g., having a range from 0-255, the HDR image 164 may represent pixel luminance values using a 16-bit value, e.g. to accommodate a range from 0-65, 535. However, the display device 170 may only support an 8-bit luminance value per pixel. Therefore, 16-bit luminance values of the HDR image 164 are compressed to 8-bit values to be displayable at the display device 170.

The HDR compression module 118 compresses the HDR image 164 using both local tone mapping and global tone mapping. For example, global tone mapping may be used to reduce a large number of luminance values of a high dynamic range image to a smaller number of luminance values based on a distribution of luminance values throughout the entire HDR image 164. However, the global tone mapping may be sub-optimal in any particular region of the HDR image 164. For example, a global tone mapping may not provide a large enough dynamic range for both the bright area around the sun and the shaded area at the base of the tree. On the other hand, local tone mapping may logically divide a high dynamic range image into multiple regions and selectively map pixel luminance values to a reduced range of luminance values on a region-by-region basis. Thus, local tone mapping may enable a more locally effective mapping of dynamic range to the reduced range of luminance values but may result in a loss of uniformity across the multiple regions of the image.

The HDR compression module 118 may perform a global tone mapping and also a local tone mapping based on received HDR image data and select the local tone mapping, the global tone mapping, or a weighted combination of the local tone mapping and the global tone mapping on a pixel-by-pixel basis. For example, when a pixel under consideration is in an area of high variation of luminance values, the HDR compression module 118 may select a larger weighting of the local mapping to provide a larger dynamic range of luminance values in the region of the pixel. In contrast, where there is not a significant amount of luminance variation in the neighborhood of the particular pixel, the HDR compression module 118 may select a larger weighting of the global tone mapping for greater uniformity throughout the image.

By combining the one or more low dynamic range images 160, 162 using different exposure values, and then compressing the resulting HDR image 164 using both local and global tone mappings, the system 100 enables image generation that provides effectively greater dynamic range in the regions of interest while preserving compatibility with lower dynamic range technologies. In addition, by selectively combining local tone mapped pixel values and global tone mapped pixel values to compress the HDR image 164 to a smaller range of luminance values, an appropriate mapping technique or a blend of mapping techniques can be selected based on particular image characteristics, and the selection of mapping techniques may be varied throughout the image as the image characteristics vary.

Although in the particular embodiment illustrated in FIG. 1 the image capture device 102 is illustrated as having a single sensor 108, in other embodiments the image capture device 102 may have multiple sensors. For example, the image capture device 102 may have two or more sensors configured to perform multiple concurrent image captures of a particular scene using different exposure settings to provide the LDR images 160 and 162. In an embodiment having multiple sensors, the sensors need not be identical and may instead have different properties.

Other embodiments may couple multiple sensors with multiple image processing systems 130. By including a separate image processing system 130 for each sensor, processing speed of each sensor's data can be increased, since there is no need to share an image processing system 130 between two sensors. Such embodiments may be useful when high frame rates are demanded with minimal processing delay, such as in certain video applications.

Figure 2:
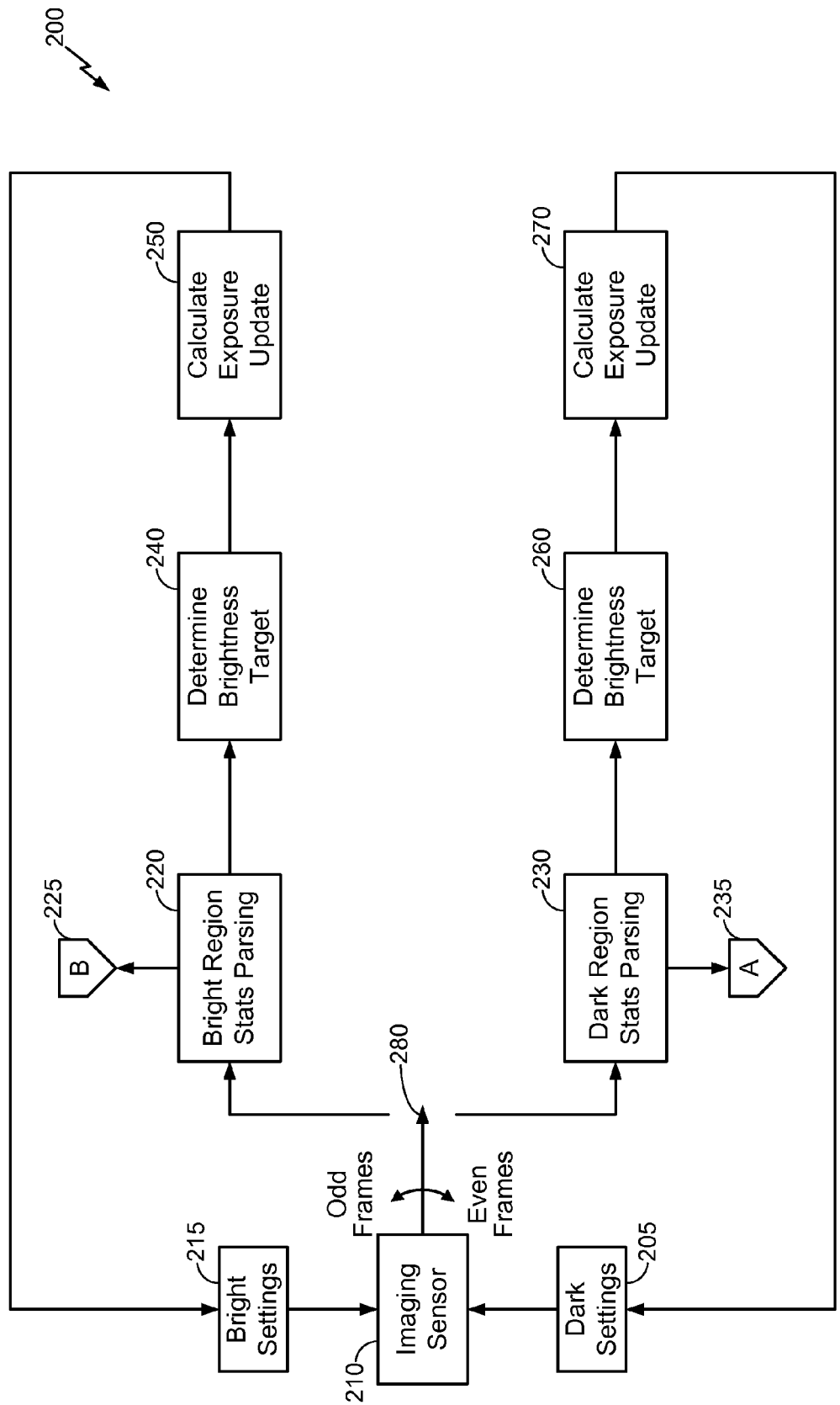
FIG. 2 is a data flow diagram of an illustrative embodiment of an auto exposure control system.

Referring to FIG. 2, the data flow of an illustrative embodiment of an auto exposure control is depicted and generally designated 200. The data flow begins at imaging sensor 210, which captures image data based on one of two sets of control parameters 205 and 215. The image data then flows to a gate 280. Depending on the position of the gate 280, the image data then flows either to the upper path and module 220 or to the lower path and module 230. The position of the gate 280 is determined by whether the imaging sensor 210 has captured the image using the long exposure settings 205 or the short exposure settings 215. In one embodiment, the imaging sensor 210 alternates between the two sets of settings, causing the gate to also alternate between the corresponding upper data path and the lower data path. Following the upper data path to module 220, module 220 collects statistics on the bright regions of the image. These statistics are sent to the auto white balance module via off-page reference 225, discussed later. The statistics also move to module 240 to enable the determination of the overall brightness of the image as compared against a brightness target. Next, the overall brightness of the image is sent to module 250, where exposure parameters are updated in preparation for capturing the next short exposure image. These new exposure parameters then flow to the bright settings 215 of the imaging sensor 210.

Following the lower branch from the gate 280, the image data flows to module 230, where the region statistics for the dark region of the image data are calculated. These statistics are also sent to the auto white balance module via off page reference 235, discussed below. The statistics are also sent to module 260, where the overall brightness of the image is compared to a target brightness of the dark image. The results of this calculation are sent to module 270, where any necessary exposure control parameters are adjusted and sent to the dark settings 205, in preparation for the next long exposure image to be captured by the imaging sensor.

Note that in embodiments utilizing multiple imaging sensors, the need for gate 280 is eliminated. Instead, a first imaging sensor sends image data directly to the bright region stats parsing module 220. The first imaging sensor reads its settings from the bright settings module 215. A second imaging sensor sends image data directly to the dark region stats parsing module 230, reading its settings from the dark settings module 205.

Thus, the system illustrated by FIG. 2, also known as an auto exposure control loop, represents one means for capturing an image of a scene from at least one sensor, wherein the image has a bright region and a dark region. When the imaging sensor reads its settings from the bright settings module 215, and gate 280 allows data to flow to module 220, the system illustrated by FIG. 2 represents a means for the image to be captured using an exposure setting based on the bright region. When the imaging sensor reads its settings from the dark settings module 205, and gate 280 allows data to flow to module 230, the system illustrated by FIG. 2 represents a means for the image to be captured using an exposure setting based on the dark region.

Figure 3:
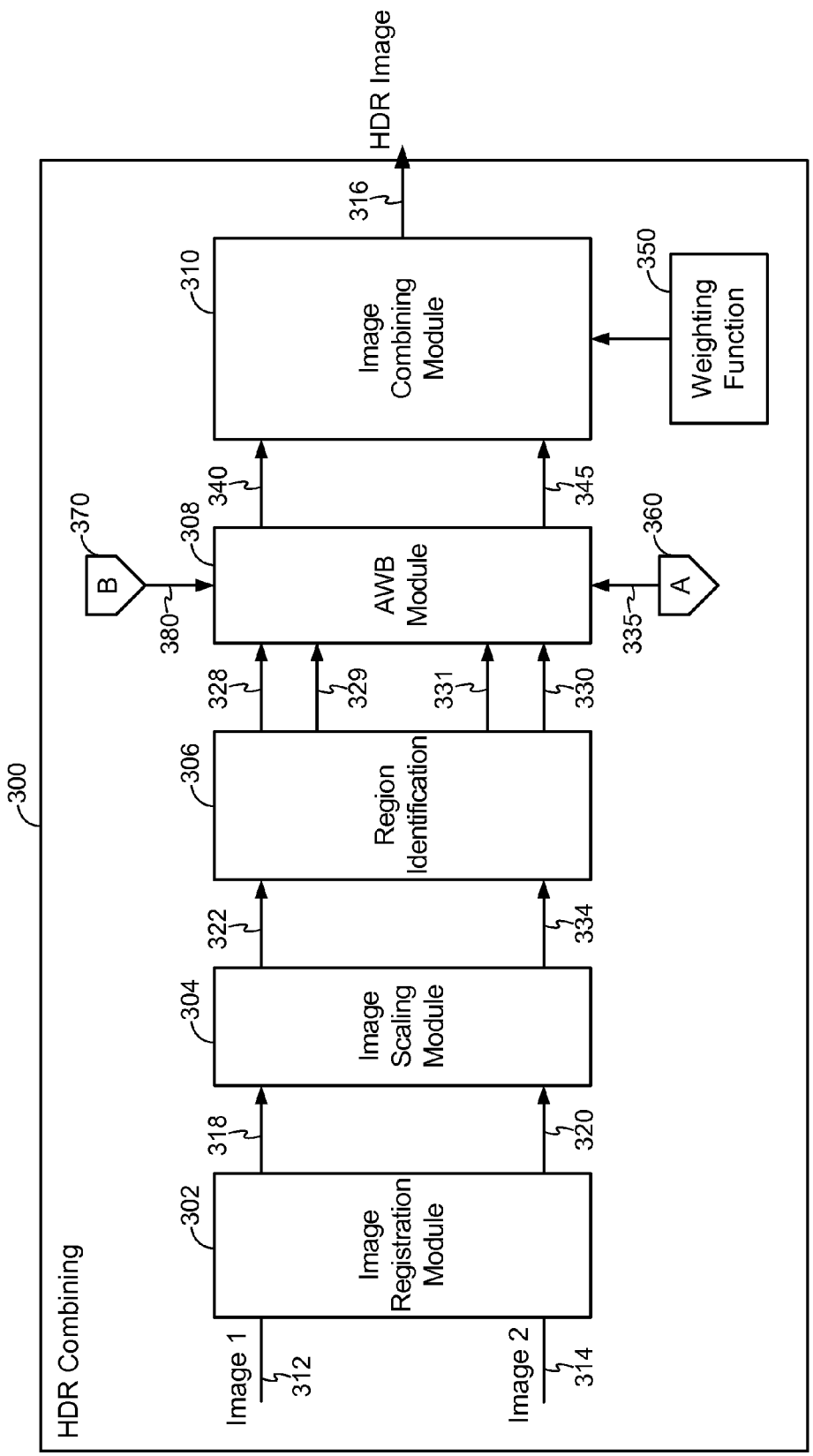
FIG. 3 is a block diagram of an illustrative embodiment of a high dynamic range image combining system, including a region identification module and an auto white balance module.

Referring to FIG. 3, an illustrative embodiment of a high dynamic range (HDR) image combining system is depicted and generally designated 300. The system 300 includes an image registration module 302, an image scaling module 304, a region identification module 306, an auto white balance module 308, and an image combining module 310, and a weighting function 350. The system 300 combines first image data 312 and second image data 314 to generate HDR image data 316. In an illustrative embodiment, the system 300 may be included in the HDR combining module 116 of FIG. 1.

The first image data 312 may include an output of an image sensor corresponding to an image using a first exposure time, while the second image data 314 may include an output of the same image sensor (or another image sensor) corresponding to the image using a second exposure time. For example, the first image data 312 may be exposed using an exposure time of N, while the second image data 314 may be exposed using an exposure time of 1.5N, 2N, 4N, or any other integer or non-integer multiple of N.

In a particular embodiment, the image registration module 302 is configured to include instructions that receive the first image data 312 and the second image data 314. The image registration module 302 may be configured with instructions to determine one or more offsets to the first image data 312 and the second image data 314 to enable an accurate registration of the images to generate first aligned image data 318 and second aligned image data 330. For example, the first image data 312 may be offset from the second image data 314 due to movement of the camera, such as by a hand shake or other camera motion or movement of objects within the image. The image registration module 302 may include instructions that determine one or more motion vectors corresponding to regions or pixels of the image data 312 and 314. The motion vectors enable at least one of the first image data 312 and the second image data 314 to be adjusted so that corresponding portions of each image are located at substantially the same pixel locations of each image in the first aligned image data 318 and the second aligned image data 330.

The image scaling module 304 is configured to include instructions that modify an intensity of various pixel levels of one or more of the aligned image data 318 and 320 to generate first scaled image data 322 and second scaled image data 334. For example, if the second aligned image data 320 has an exposure time equal to twice that of the first aligned image data 318, luminance values corresponding to each pixel of the first aligned image data 318 may be adjusted to compensate for an approximate amount of light the pixel would have received had it been exposed for the same amount of time as the second aligned image data 320. Also, scaling of luminance values may be estimated by instructions within module 304 on the fly. In a particular embodiment, one result of scaling the luminance values of the first aligned image data 318 is that a range of scaled luminance values of the first aligned image data 318 may exceed an available number of luminance values in a low dynamic range image data format. Therefore, the first scaled image data 322 may be represented using a larger number of data bits for each pixel than the first image data 312.

In a particular embodiment, the image scaling module 304 is configured with instructions to scale only one of the first aligned image data 318 or the second aligned image data 320 based on relative exposure times of the first and second images to generate the first scaled image data 322 and the second scaled image data 334. However, in other embodiments the instructions may adjust one or both of the first aligned image data 318 and the second aligned image data 320.

In a particular embodiment, the region identification module 306 may be configured with instructions to receive the scaled image data 322 and 334 from the image scaling module 304. In a particular embodiment, instructions in the region identification module 306 may receive the first scaled image data 322 corresponding to a shorter exposure time, such as the image data 312 scaled by the image scaling module 304. Instructions within the region identification module then identify one or more bright regions from the scaled image data 322.

Alternatively, instructions in the region identification module 306 may receive the second scaled image data 334 corresponding to a longer exposure time, such as image data 314 scaled by the image scaling module 304. Instructions within the region identification module then identify one or more dark regions from the scaled image data 334.

In a particular embodiment, the auto white balance module 308 may be configured with instructions to receive the image data 328 and 330 from the region identification module. The auto white balance module also includes instructions to receive region information for the shorter exposure time image 329 and region information for the long exposure image 331 from the region identification module. The region information identifies portions of each image data 328 and 330 that will be utilized in the final image. The auto white balance module also includes instructions to receive exposure information 335 and 380 associated with each image data. Instructions within the auto white balance module then perform a white balance operation on each image data 328 and 330.

In a particular embodiment, the image combining module 310 may be configured with instructions to receive the white balanced data 340 and 345 from the auto white balance module 308 and with instructions to combine the received image data to produce the high dynamic range image data 316. In a particular embodiment, instructions within the image combining module 310 may receive the first white balanced image data 340 corresponding to a shorter exposure time, such as the image data 312 scaled by the image scaling module 304 and white balanced by the auto white balance module 308. In addition, instructions within the image combining module 310 may receive the second white balanced image data 345, corresponding to a longer exposure time, such as image data 314 scaled by the image scaling module 304 and white balanced by the auto white balance module 308. The image combining module 310 may include instructions, internal logic or other decision circuitry to determine for each particular pixel of the HDR image data 316 whether to include values corresponding to the first scaled image data 340, the second scaled image data 345, or a combination of both.

In a particular embodiment, the image combining module 310 is configured with instructions to receive one or more values from the weighting function 350. The weighting function 350 may include one or more conditions or values to enable instructions within the image combining module 310 to selectively combine the first white balanced image data 340 and the second white balanced image data 345 to produce the HDR image data 316. For example, the weighting function 350 may include a representation of one or more step functions, one or more sigmoid functions, or one or more other functions to blend, distinguish, or otherwise determine or select pixel values of the HDR image data 316 from the first white balanced image data 340 and the second white balanced image data 345. To illustrate, a metric such as a luminance variation within a region of a pixel may be determined from the white balanced image data 340 and/or 345 and provided to the weighting function 350. The weighting function 350 may return a value that indicates a scaling factor to be applied to a value of the pixel in the first white balanced image data 340 and/or a value of the pixel in the second white balanced image data 345, prior to adding the value of the pixel in the first scaled image data 340 to a value of the pixel in the second scaled image data 345 to generate the pixel value in the HDR image data 316.

Thus, the HDR image combining system illustrated in FIG. 3 represents one means for generating a high dynamic range digital image by combining a first image and a second image. More generally, an image pipeline comprising an image registration module, image scaling module, region identification module, auto white balance module, and an image combining module represents another means for generating a high dynamic range digital image by combining a first image and a second image.

Figure 4A:
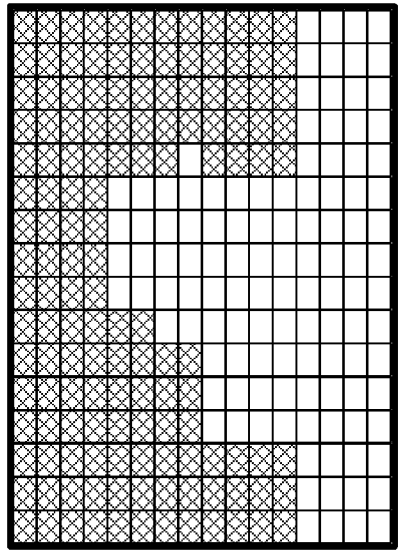
FIGS. 4A and 4C are two images.
Figure 4B:
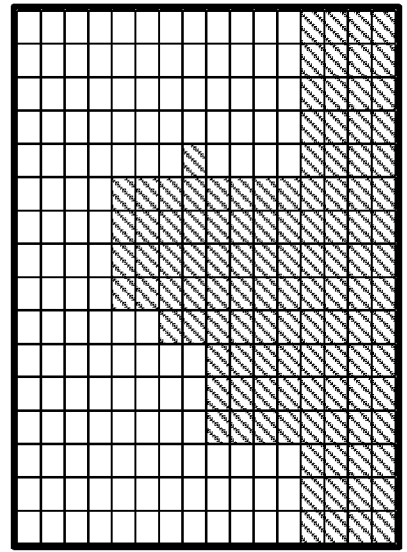
FIG. 4b and FIG. 4d illustrate the identification of regions within each image suitable for optimizing a white balance operation.
Figure 4C:
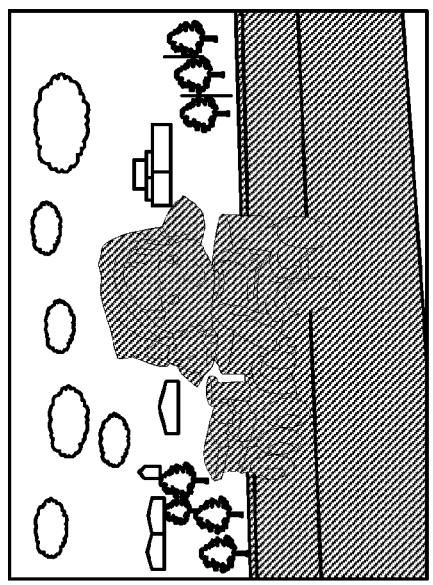
Figure 4D:
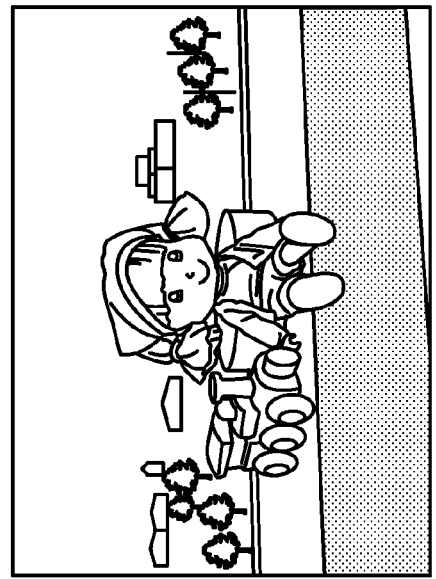

FIGS. 4a through 4d illustrate optimization of exposure for a dark region in an image and a light region of an image. FIG. 4a simulates an image optimized for a bright region by use of a short exposure. The sky and background behind the window ledge the doll is sitting on are well exposed, with good detail. In contrast, the foreground image is dark and details cannot be distinguished. The short exposure does not provide the amount of light to the sensor needed to distinguish detail in those areas. In one embodiment, a white balance of FIG. 4a will be based on image data from only the are corresponding to the shaded portion of FIG. 4b. Alternate embodiments may utilize the entire image as a basis for white balance. However, the underexposed regions may result in a suboptimal white balance result in those embodiments. FIG. 4c simulates the results of an exposure optimized for the foreground portion of the same image. The doll, toy locomotive, and window ledge are well exposed and clear. The background sky and clouds are over exposed in FIG. 4c, resulting in a loss of detail due to image sensor saturation in those areas. One embodiment of a white balance optimization algorithm will utilize areas of FIG. 4c corresponding to the shaded portion of FIG. 4d to calculate white balance gains for FIG. 4c.

Figure 5:
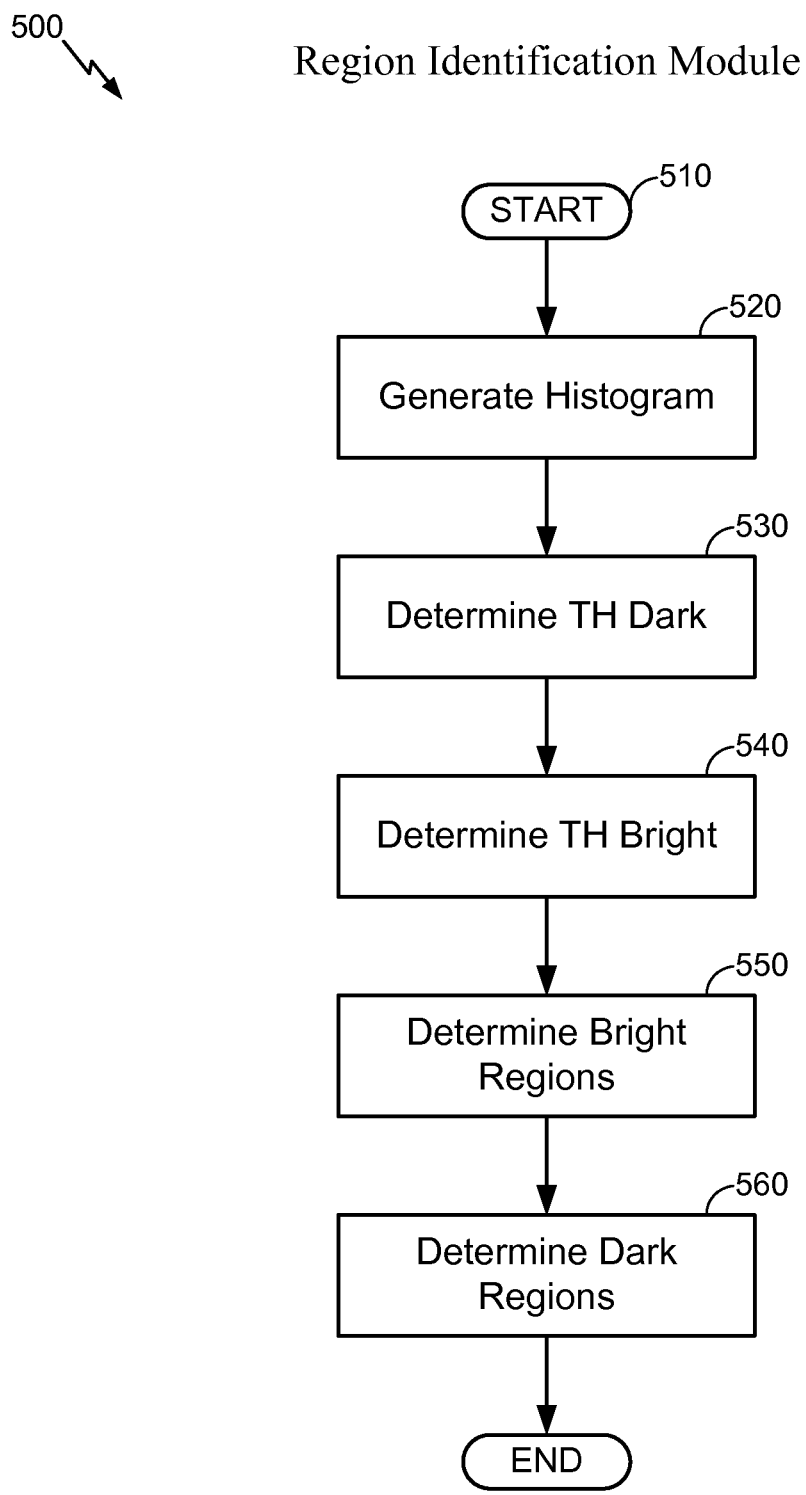
FIG. 5 is a flow chart of an illustrative embodiment of a region identification module.

FIG. 5 is a flow chart illustrating a process 500 that runs within one embodiment of the region identification module 306. In one embodiment, the region identification module 306 includes instructions that begin the process 500 at start state 510 and then move to state 520 where instructions generate a luminance histogram. Process 500 then moves to state 530. In step 530, process 500 determines the threshold used for determining a dark region of the image.

In one embodiment, the threshold for the dark region is proportional to the number of pixels that have values below some level. For example, with a pixel width of 8 bits, the dark threshold might be determined by first identifying the number of pixels with values less than four (pixel bits 2-7 clear). The number of pixels below four is then divided by the total number of pixels to find the proportion of image area represented by pixels below four. Other embodiments may choose a different threshold, based on their individual design considerations.

Some embodiments may identify additional thresholds to create multiple regions. For example, in embodiments with more processing power, the number of regions can be increased, with each individual region being made smaller to provide more precision.

In some embodiments, the dark threshold is then determined by multiplying this value by a constant $k_{dark}$, and then an $offset_{dark}$ is added. $K_{dark}$ is used to determine how much bias or effect the darkest regions of the image will have on determining the dark threshold. $Offset_{dark}$ determines the starting point for the threshold, for example, the offset from 0 for the dark region threshold or the distance from 255 (with 8 bit pixels) for the bright threshold, discussed further below. $Offset_{dark}$ also adds flexibility to the determination of the dark thresholds. A formulaic representation of a method used to calculate the dark threshold is:

$$\sum_{n=Hist\_min]}^{n=Hist\_threshold} histogram[n]/num\_pixels \times K_{dark} + offset_{dark}$$

After the threshold for the dark regions is determined, process 500 moves to step 540, where the threshold for the bright regions is determined. The threshold for the bright regions is determined in a similar manner as the dark threshold. For example, first the number of pixels above a particular value is determined. For purposes of illustration, the number of 8 bit pixels above a value of 252 (0xFC) might be used (bits 3-7 set to 1). Similar to the dark threshold, in one embodiment, the bright threshold is then determined by multiplying this value by a constant $K_{bright}$, and an $offset_{bright}$ is added. Such a determination is represented by the following formula:

$$\sum_{n=HistMax-Histthreshold]}^{n=HistMax} histogram[n]/num\_pixels \times K_{bright} + offset_{bright}$$

After the bright threshold has been determined, process 500 moves to step 550 to determine the bright regions. In one embodiment, the bright regions are those regions that have a region brightness average greater than or equal to the bright threshold. Techniques for identifying such regions are known in the art. For example, see U.S. Patent Application No. 2006/0262363, Rendering of High Dynamic Range Images, para. 10 (filed May 23, 2005) and U.S. Pat. No. 6,177,958, System and Method for the Automatic Capture of Salient Still Images, col. 8, 1. 5 (filed Mar. 11, 1998). After the bright regions have been determined, process 500 moves to state 560, where the dark regions are identified. In one embodiment, the dark regions compose those regions with a region brightness average lower than the dark threshold. After step 560 has determined the dark threshold, process 500 ends.

Figure 6:
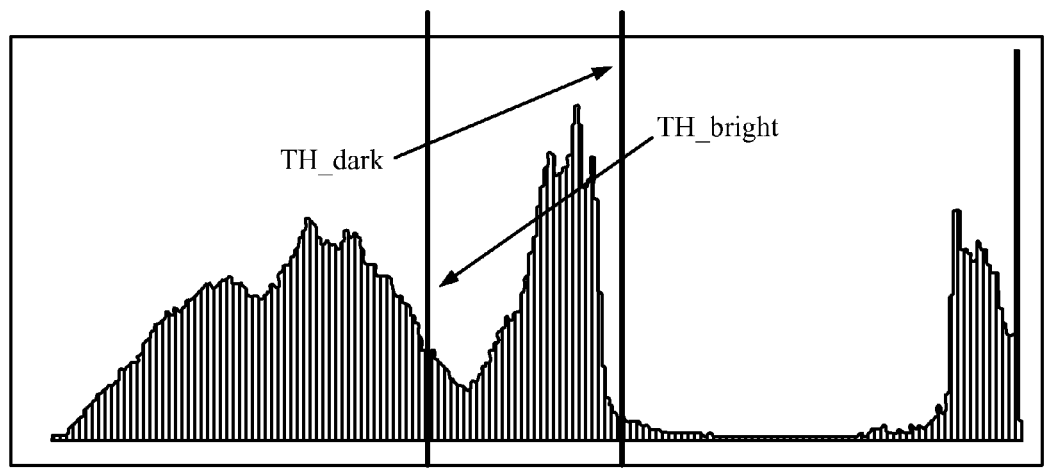
FIG. 6 is graph showing thresholds for a luminance histogram with light and dark regions.

FIG. 6 is a graph of a typical luminance histogram. The two thresholds, TH_DARK and TH_BRIGHT are illustrated. The set of pixel values above the TH_BRIGHT threshold are observable to the left of the green line. These pixels represent the bright region of the image. Pixel values to the right of the TH_DARK line represent the dark region of the image. Those pixels between the lines are neither part of the dark region nor the bright region.

When TH_DARK AND TH_BRIGHT overlap, less exposure separation between the multiple images is typically needed. Alternatively, the scene may have a relatively small dynamic range, and thus, similar exposures can be used for both the bright and dark regions. However, if TH_DARK AND TH_BRIGHT have a large separation, this indicates a greater separation in exposures between the two regions is required.

Figure 7:
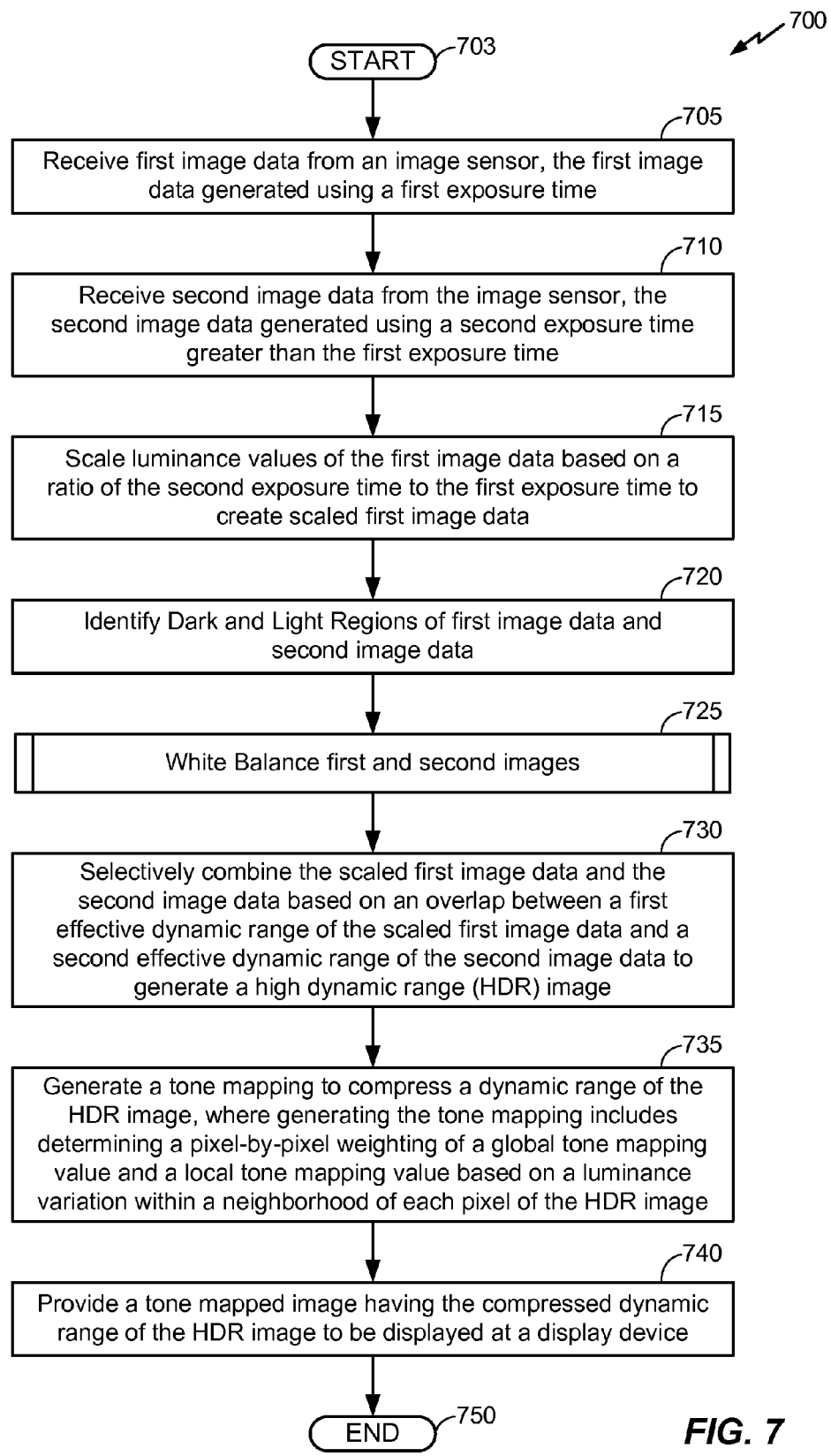
FIG. 7 is a flow diagram of a first illustrative embodiment of a method of high dynamic range image combining.

FIG. 7 is a flow diagram of an illustrative embodiment of a method of high dynamic range image combining. In a particular embodiment, the method 700 is performed by the system of FIGS. 1-3, or FIGS. 11-12, or any combination thereof Process 700 begins at start step 703 and then moves to step 705 where first image data is received from an image sensor. The first image data is generated using a first exposure time. Process 700 then moves to step 710, where second image data is received from the image sensor. The second image data is generated using a second exposure time greater than the first exposure time.

Process 700 then moves to step 715, where luminance values of the first image data are scaled based on a ratio of the second exposure time to the first exposure time to create scaled first image data. Process 700 then moves to step 720, where dark and light regions of first image data and second image data are identified. Process 700 then moves to step 725, where the first image data and the second image data are white balanced according to the region information and exposure settings for the first and second images. Step 725 is explained in further detail in process 800.

Process 700 then moves to step 730, where the scaled first image data and the second image data are selectively combined based on an overlap between a first effective dynamic range of the scaled first image data and a second effective dynamic range of the second image data to generate a high dynamic range (HDR) image. The first effective dynamic range may be determined based on a first saturation level, a first dark level, and a first noise floor of the first image data. The second effective dynamic range may be determined based on a second saturation level, a second dark level, and a second noise floor of the second image data. The scaled first image data and the second image data may be selectively combined using a first sigmoid function substantially centered at the first noise floor and a second sigmoid function substantially centered at the second saturation level minus the second dark level.

Moving to 735, a tone mapping is generated to compress a dynamic range of the HDR image. Generating the tone mapping includes determining a pixel-by-pixel weighting of a global tone mapping value and a local tone mapping value based on a luminance variation within a neighborhood of each pixel. For example, the compressed dynamic range may be an eight-bit range. Continuing to 740, a tone mapped image having the compressed dynamic range is provided to be displayed at a display device. Process 700 then transitions to end state 750.

Figure 8:
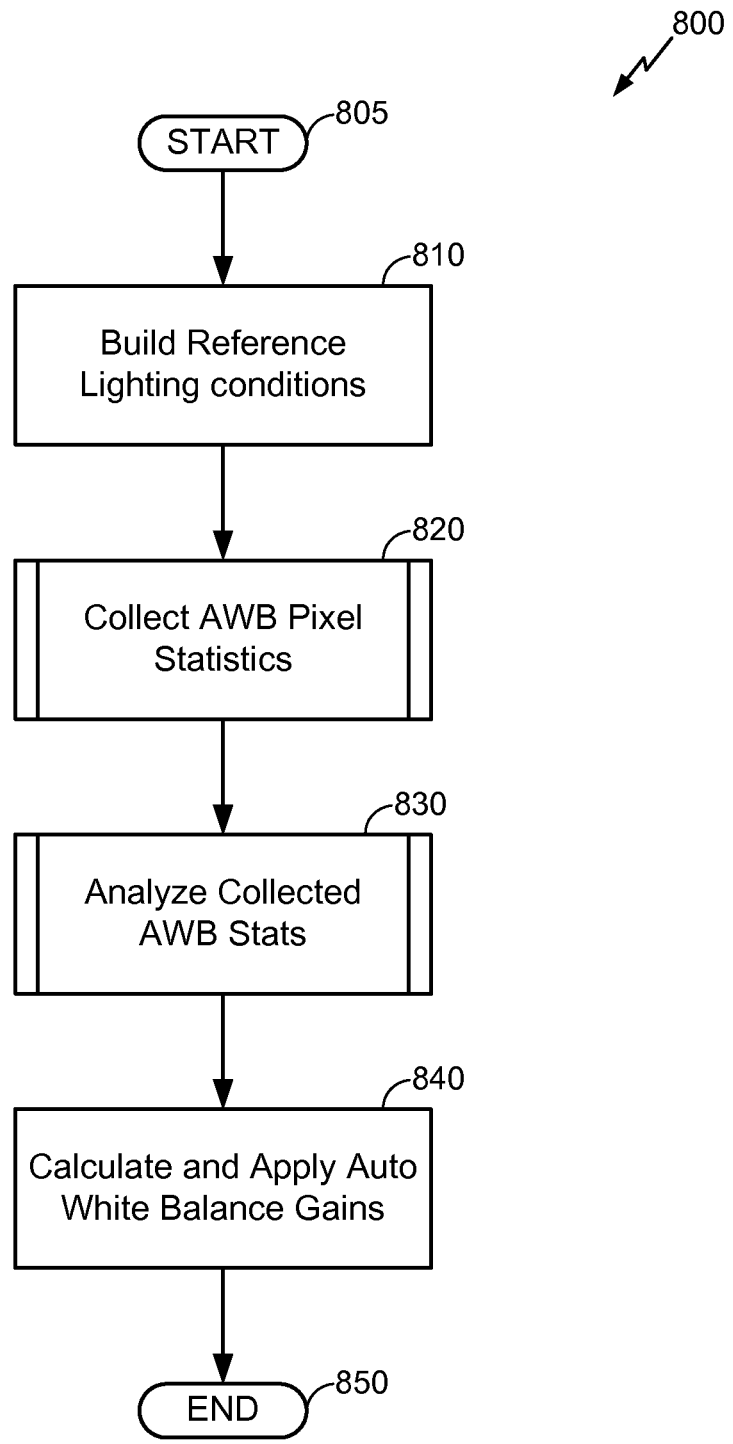
FIG. 8 is a flow chart of an illustrative embodiment of a method of automatically white balancing a digital image.

FIG. 8 is a flow diagram of an illustrative embodiment of a method of auto white balancing. Instructions implementing process 800 may be included in the set of instructions implementing step 725 of process 700. Instructions within auto white balance module 308 may also implement process 800. Alternatively, process 800 may be implemented by any of the modules or components illustrated in FIGS. 1-3 or FIGS. 11-12. Process 800 begins at start state 805 and then moves to step 810 where reference lighting conditions are built. The characterization process for a given sensor module typically takes place offline. In one embodiment, pictures of a grey chart under various illuminants are simulated, and pictures taken. These illuminants may include D90, D65, D75, TL84, florescent, horizon, incandescent, and custom fluorescent. These reference points are known in the art. The R/G and B/G ratios of the gray objects under these lighting conditions are recorded. After determining the scale of the R/G and B/G ratios, these reference points are given grid coordinates. The scale is determined in a way that the grid distance can be used to properly differentiate between different reference points. Process 800 is illustrated with step 810 integrated to provide for a complete explanation of the process of auto white balancing. However, other embodiments will implement step 810 as an offline separate task, with process 800 simply utilizing the reference light data.

After the reference lighting conditions are known, process 800 moves to step 820, where pixel statistics are collected to support the auto white balance operation to follow. This step is explained in further detail in FIG. 9. Next, process 800 moves to step 830, where the collected auto white balance statistics are analyzed. This step is explained in more detail in FIG. 10. Next, process 800 moves to step 840, where the auto white balance gains are calculated and applied. The techniques utilized in step 840 are known in the art. For example, one embodiment of step 840 may utilize a simple grey world technique, while another embodiment may utilize an advanced grey world approach. White balance by correlation may also be used in some embodiments, where the color response of the image scene is correlated with different light sources. After the auto white balance gains are applied, process 800 moves to end state 850.

Figure 9:
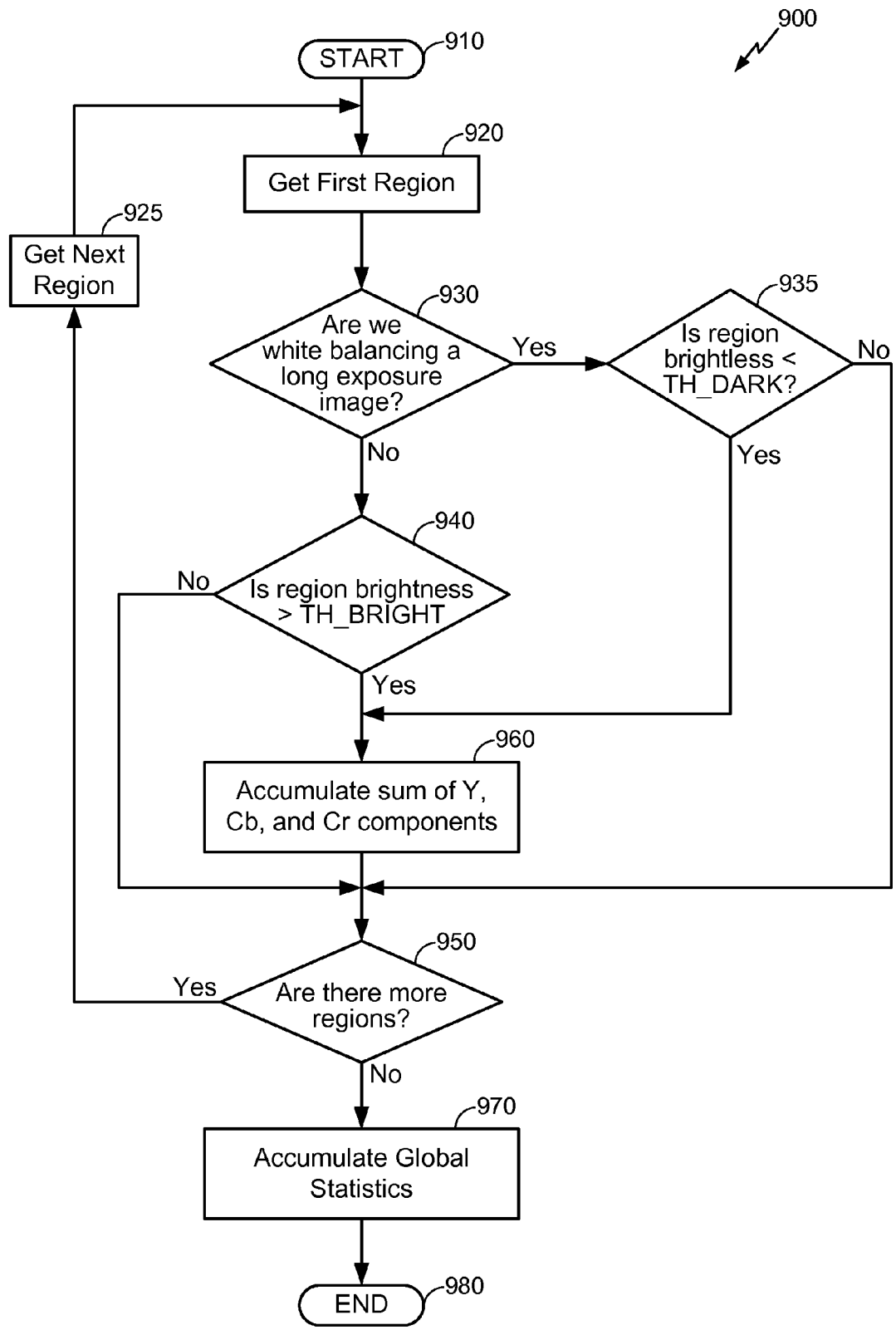
FIG. 9 is a flow chart of an illustrative embodiment of a method of collecting frame statistics as part of an automatic white balancing process.

FIG. 9 is a flow diagram of an illustrative embodiment of a method of collecting auto white balance statistics. Instructions implementing process 900 may run within a set of instructions implementing step 820 of process 800 of FIG. 8. Process 900 may also operate in accordance with any of the embodiments or methods of FIGS. 1-3, or FIGS. 11-12, or any combination thereof. Process 900 begins at start state 910 and then moves to step 920 where the first region is obtained from the image. Next, process 900 moves to decision step 930, where the process 900 determines whether a white balance is being performed for a long exposure image. If a white balance for a long exposure image is being performed, process 900 moves to step 935. In step 935, the brightness of the current region is evaluated against the TH_DARK threshold calculated in process 500, described earlier. If the region's brightness is below TH_DARK, process 900 moves to step 960, where the sum of the Y, Cb, and Cr components of the grey pixels are accumulated. If the region's brightness is not below TH_DARK, process 900 moves to decision step 950, discussed below.

If process 900 is white balancing a short exposure image, process 900 moves from decision step 930 to decision step 940. In decision step 940, process 900 determines whether the current region's brightness is above the TH_BRIGHT threshold calculated in process 500 described earlier. If the region's brightness is above TH_BRIGHT, then process 900 moves to step 960, where again the sum of the Y, Cb, and CR components of the grey pixels are accumulated. Process 900 then moves to step 950.

Decision step 950 determines if there are more regions to be evaluated. If more regions are available, process 900 moves to step 925, where the next region is obtained. Process 900 then returns to decision step 930. If decision step 950 determines no more regions are available, process 900 moves to step 970 where the global statistics are accumulated.

In one embodiment of process 900, the global white balance statistics include the Y, Cb, and Cr components for pixels that have Y values between some $Y_{min}$ and $Y_{max}$. This ensures the global statistics do not include pixels that are too dark or too bright, thus reducing noise and saturation issues. Process 900 then moves to end state 980.

Process 900, in combination with process 700, represents one means for determining the white balance of a long exposure image based at least in part on the dark region of the image. Process 900 in combination with process 700 further represents one means for determining the white balance of a short exposure image based at least in part on the bright region of the image.

Figure 10:
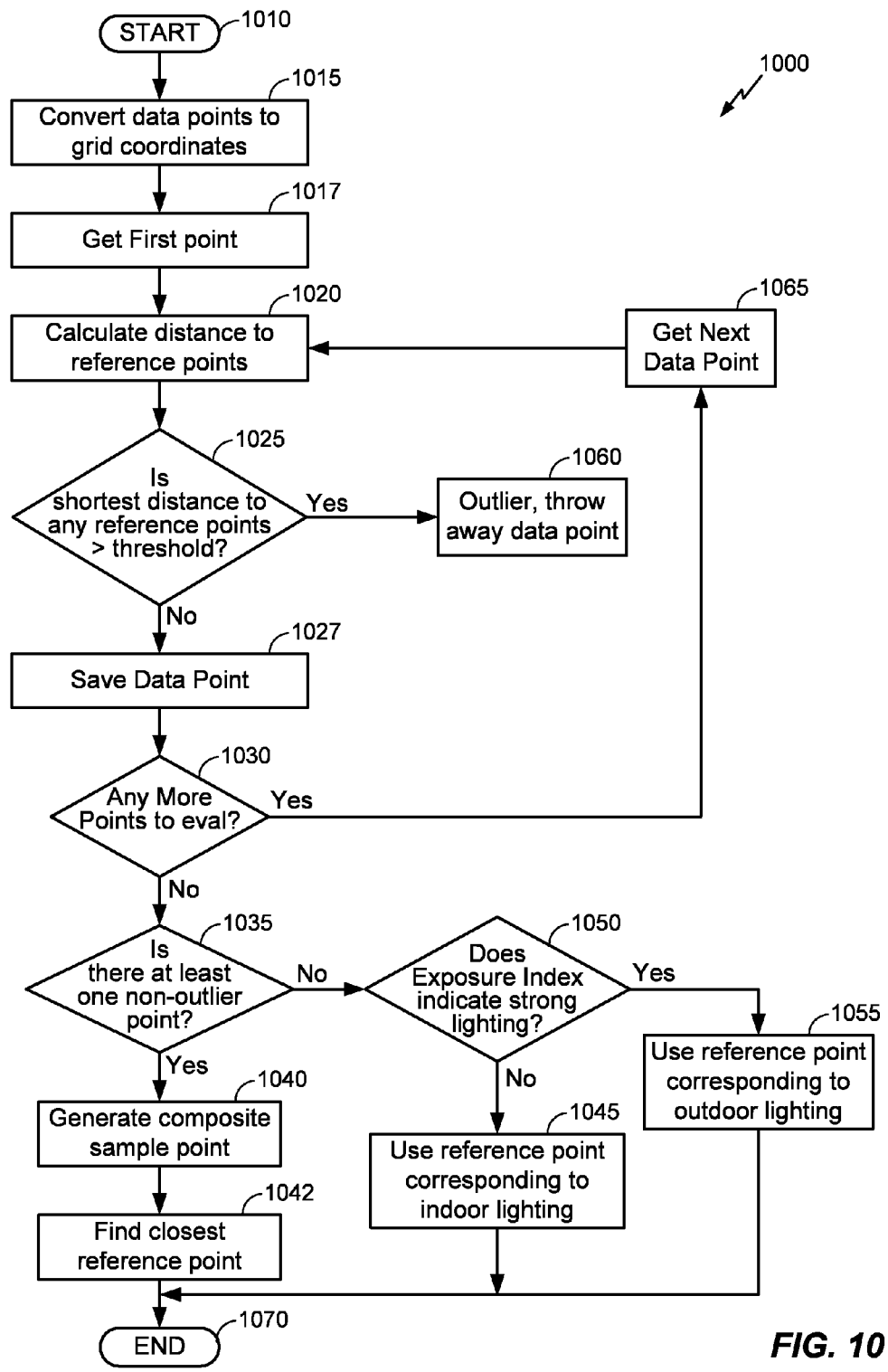
FIG. 10 is a flow chart of an illustrative embodiment of a method of analyzing frame statistics to determine a reference light source as part of an automatic white balancing method.

FIG. 10 is a flow diagram of an illustrative embodiment of a method of analyzing auto white balance statistics. Instructions implementing process 1000 may be included within a set of instructions implementing step 830 of process 800. Alternatively, process 1000 may be performed within any of the modules or components illustrated in FIGS. 1-3 or FIGS. 11-12. Process 1000 begins at start state 1010 and then moves to step 1015 where the data points collected in process 900 are converted to grid coordinates. In one embodiment of step 1015 of process 1000, the average of the sums of Y, Cb, and Cr values for each region are found by dividing each sum for a region by the number of pixels accumulated in the region. The average Y, Cb, and Cr values can then be converted back to R, G, and B values. R/G and B/G ratios are then calculated for each region, and the ratios are then converted into grid coordinates.

Next, process 1000 moves to step 1017 where the first data point is obtained. Process 1000 then moves to step 1020, where the distance from the data point to a series of reference points is calculated. For example, in one embodiment, a series of reference points could include horizon, incandescent, TL84, cool white, D65, and shade. These color references are known in the art. Once the distance to each reference point is calculated, process 1000 moves to step 1025, where the shortest distance to a reference point is compared to a threshold value. If the closest reference point is further than the threshold value, the point is considered an outlier, and process 1000 moves from decision step 1025 to step 1060 where the data point is discarded. A data point that is far from each of the reference points is most likely not a gray object. Such observations are discarded in one embodiment as they can have a negative impact on the overall distance comparison. If at least one reference point is within the threshold distance however, process 1000 moves to step 1027, where the data point is saved for later use in step 1040 when the composite point is created. Process 1000 then moves to decision step 1030, which determines whether more data points should be evaluated. If there are more points to evaluate, process 1000 moves from decision step 1030 to step 1065 where the next data point is obtained. Process 1000 then returns to step 1020.

If decision step 1030 determines there are no data points remaining for evaluation, process 1000 moves from decision step 1030 to decision step 1035, where it is determined if at least one data point was close enough to a reference point to be a non-outlier. If no data points were closer than the threshold value from a reference point, process 1000 moves from decision step 1035 to decision step 1050. In step 1050, the exposure index used to capture the frame is considered. An exposure index is typically a combination of shutter speed and aperture. If the exposure index indicates strong lighting was received during the image capture, process 1000 moves to step 1055, where a reference point corresponding to outdoor lighting is chosen. For example D50 may be chosen in one embodiment of step 1055. If the exposure index does not indicate strong lighting, process 1000 transitions from decision step 1050 to step 1045, where a reference point corresponding to indoor lighting is utilized. For example, in one embodiment, the average of TL 84 and cool white may be used as a reference.

If decision step 1035 determines that at least one data point is within a threshold distance from a reference point, process 1000 moves to step 1040. In step 1040, the composite sample point is generated. To generate a composite sample point, the average of R/G and B/G ratios for all non outlier points is calculated. Process 1000 then moves to step 1042, where the reference point closest to the composite point is determined. The closest reference point is considered the lighting condition for the frame. Process 1000 then moves to end state 1070 from step 1042, 1045, or 1055.

Figure 11:
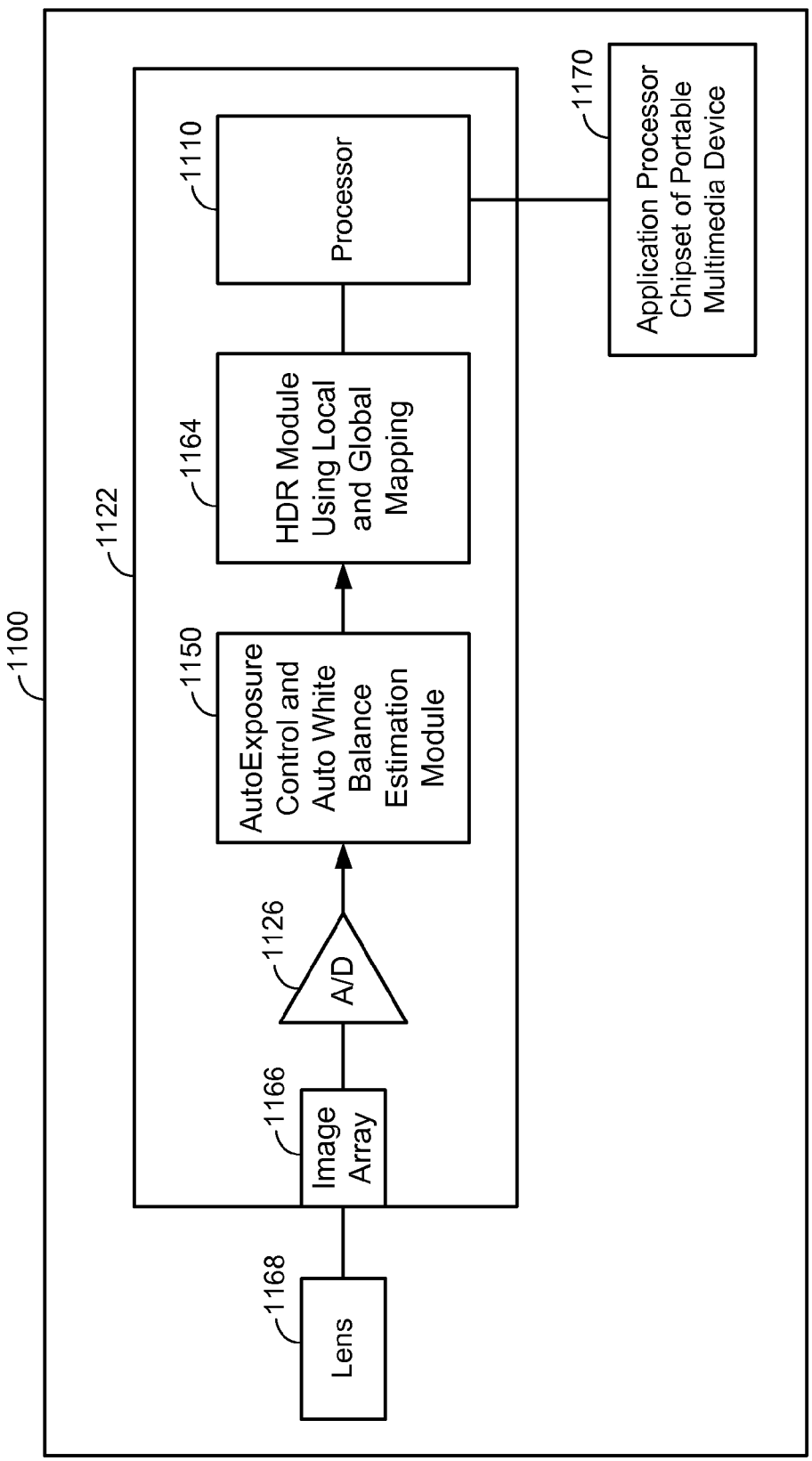
FIG. 11 is a block diagram of a particular embodiment of a device including a high dynamic range combining module.

FIG. 11 is a block diagram of a particular embodiment of a system including a high dynamic range (HDR) combining and compression module. The system 1100 includes an image sensor device 1122 that is coupled to a lens 1168 and also coupled to an application processor chipset of a portable multimedia device 1170. The image sensor device 1122 includes an auto exposure control and auto white balance estimation module 1150 to estimate auto-exposure control and auto white balance parameters, and a HDR module using local and global mapping 1164 that may include instructions that implement one or more of the modules or systems of FIGS. 1-3, or may include instructions that cause it to operate in accordance with any of the embodiments or methods of FIG. 5, or 7-10, or any combination thereof.

The auto-exposure control and auto white balance estimation module 1150 is coupled to receive image data from an image array 1166, such as via an analog-to-digital convertor 1126 that is coupled to receive an output of the image array 1166 and to provide the image data to the autoexposure control and auto white balance estimation module 1150.

The HDR module using local and global mapping 1164 is coupled to receive image data from the auto exposure and auto white balance estimation module 1150. The HDR module using local and global mapping 1164 may generate HDR image data from multiple images captured at the image array 1166 to enable HDR functionality with an ordinary image array 1166. In addition, the HDR module using local and global mapping 1164 may compress the resulting image to be compatible with lower-resolution transport and storage mechanisms using a combination of both local and global tone mapping while ensuring continuity and without introducing artifacts.

For example, the HDR module using local and global mapping 1164 may include a global mapping module configured to generate first globally mapped luminance values within a region of an image, a local mapping module configured to generate second locally mapped luminance values within the region of the image, and a combination module configured to determine luminance values within a corresponding region of an output image using a weighted sum of the first globally mapped luminance values and the second locally mapped luminance values. A weight of the weighted sum is at least partially based on a luminance variation within the region of the image. For example, the weight may be determined on a pixel-by-pixel basis within the region.

The HDR module using local and global mapping 1164 may also be configured to generate a flatness map corresponding to a portion of the image. The flatness map may indicate the luminance variation within the region of the image. The HDR module may be configured to determine a luminance variance within a neighborhood of a particular pixel within the region. An entry of the flatness map corresponding to the particular pixel may be proportional to a ratio of the luminance variance within the neighborhood of the particular pixel to a luminance mean within the neighborhood of the particular pixel.

The image sensor device 1122 may also include a processor 1110. In a particular embodiment, the processor 1110 is configured to implement the HDR module using local and global mapping 1164. For example, the processor 1110 may be configured to read instructions from a processor-readable medium and to execute the instructions to implement the HDR module 1164. In another embodiment, the HDR module using local and global mapping 1164 is implemented as image processing circuitry.

In another particular embodiment, the processor 1110 is configured to implement the autoexposure control and auto white balance estimation module 1150. In another embodiment, the autoexposure control and auto white balance estimate module 1150 is implemented as image processing circuitry.

The processor 1110 may also be configured to perform additional image processing operations, such as one or more of the operations performed by the modules 110-120 of FIG. 1. The processor 1110 may provide processed image data to the application processor chipset 1170 for further processing, transmission, storage, display, or any combination thereof.

Figure 12:
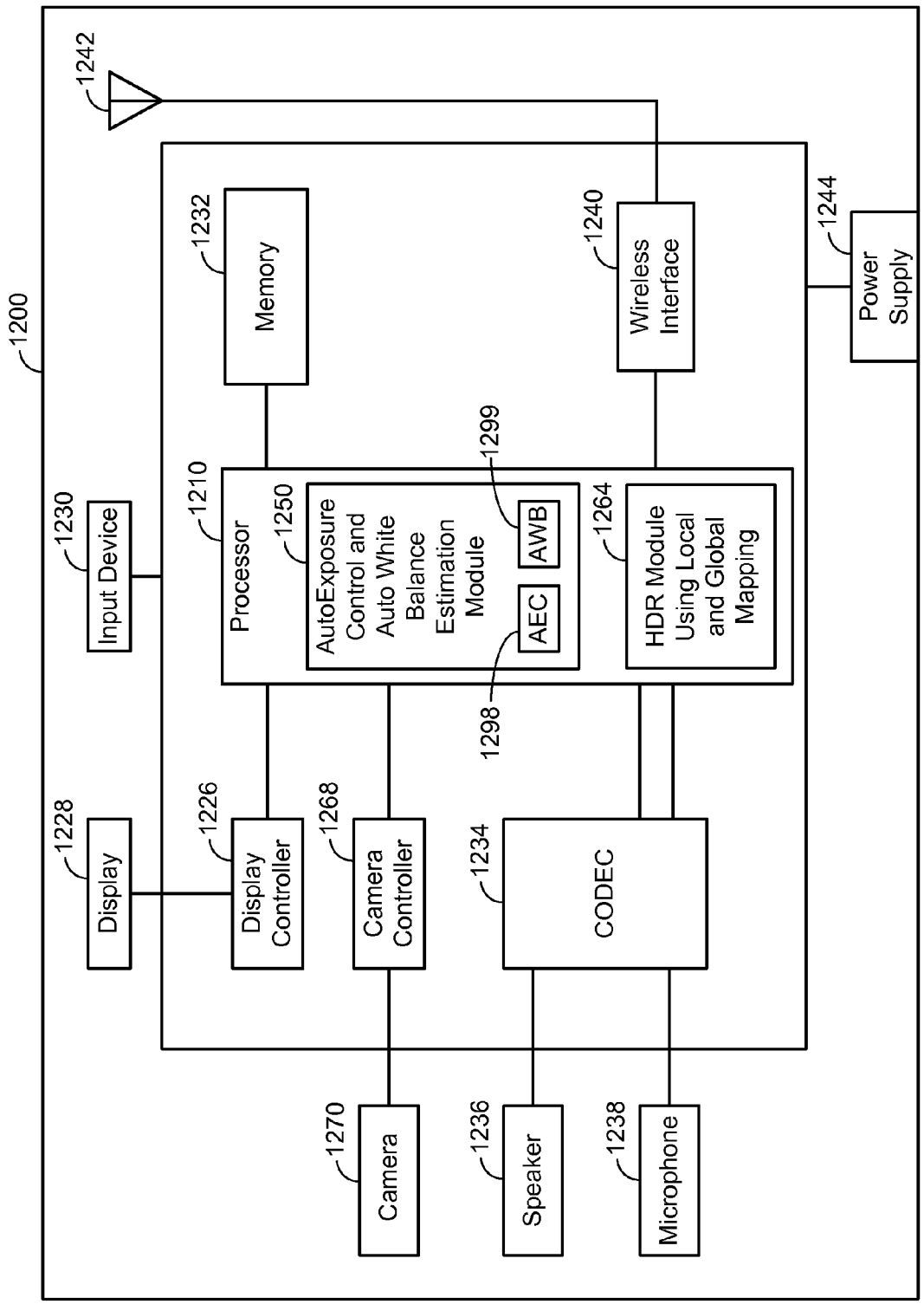
FIG. 12 is a block diagram of a wireless communication device including a high dynamic range combining module.

FIG. 12 is a block diagram of particular embodiment of a system including an auto exposure control and auto white balance estimation module 1250 and a HDR combining and compression module 1264. The system 1200 may be implemented in a portable wireless electronic device and includes a processor 1210, such as a digital signal processor (DSP), coupled to a memory 1232. The system 1200 includes an auto-exposure control and auto white balance estimation module 1250. The auto-exposure control and auto white balance estimation module 1250 may be in the signal processor 1210 or may be a separate device or circuitry along a hardware image processing pipeline (not shown). The auto-exposure control and auto white balance estimation module 1250 includes means for controlling an auto-exposure 1298 and means for controlling an auto white balance 1299. The means for controlling an auto-exposure 1298 and means for controlling an auto white balance 1299 may include hardware circuitry, firmware, a processor or a controller executing code, a field programmable array, or any combination thereof.

The system 1200 also includes an HDR module using local and global mapping 1264. In an illustrative example, the HDR module using local and global mapping 1264 includes one or more of the modules or systems of FIGS. 1-3, or operates in accordance with any of the embodiments or methods of FIG. 5 or FIGS. 7-10, or any combination thereof. The HDR module using local and global mapping 1264 may be in the processor 1210 or may be a separate device.

A camera interface 1268 is coupled to the processor 1210 and also coupled to a camera, such as a video camera or still camera 1270. A display controller 1226 is coupled to the processor 1210 and to a display device 1228. A coder/decoder (CODEC) 1234 can also be coupled to the processor 1210. A speaker 1236 and a microphone 1238 can be coupled to the CODEC 1234. A wireless interface 1240 can be coupled to the processor 1210 and to a wireless antenna 1242.

In a particular embodiment, the processor 1210 includes the HDR module using local and global mapping 1264 and is adapted to generate HDR image data from multiple images captured by the camera 1270 to enable HDR functionality with an ordinary camera 1270. In addition, the HDR module using local and global mapping 1164 may compress the resulting image to be compatible with lower-resolution transport and storage mechanisms using a combination of both local and global tone mapping while ensuring continuity and without introducing artifacts.

The processor 1210 may also be adapted to generate and compress HDR image data from multiple sets of image data that may be received from various sources. For example, the image data may include video data or still images from the camera 1270, image data from a wireless transmission via the wireless interface 1240, or from other sources such as an external device coupled via a universal serial bus (USB) interface (not shown), as illustrative, non-limiting examples.

In a particular embodiment, the processor 1210 is configured to generate tone mapped image data including a tone mapped pixel value of each particular pixel of a plurality of pixels of image data based on a luminance variation within a neighborhood of the particular pixel, and to provide the tone mapped image data to display at the display device 1228. For example, the tone mapped data may be the output image data 316 of FIG. 3. In addition, the processor 1210 may be further configured to store the tone mapped image data at the memory 1232 or to provide the tone mapped image data to be communicated via the wireless interface 1240.

The image data may be high dynamic range (HDR) image data that is generated by combining a first set of image data received from the camera 1270 using a first exposure time and a second set of image data received from the camera 1270 using a second exposure time. The first and second set of image data may be sequentially captured at a single sensor of the camera 1270, or may be concurrently captured at multiple sensors of the camera 1270 using different exposure conditions. The luminance values of the first set of image data may be scaled based on a ratio of the second exposure time to the first exposure time. Both the first and second set of image data may then be white balanced, based on either the dark region or the bright region of the image data. The first image data is then selectively combined with the second set of image data based on an overlap between a first effective dynamic range of the scaled luminance values and a second effective dynamic range of the second set of image data to generate the HDR image data, such as described with respect to FIG. 6. The processor 1210 may be further configured to process the HDR image data to generate a flatness map that indicates the luminance variation within the neighborhood of the particular pixel, and to determine the tone mapped pixel value of the particular pixel using a weighted sum of globally mapped image data and locally mapped image data. A weight of the weighted sum may be determined based on the luminance variation within the neighborhood of the particular pixel.

The display controller 1226 is configured with instructions to receive the processed image data and to provide the processed image data to the display device 1228. In addition, the memory 1232 may be configured to receive and to store the processed image data, and the wireless interface 1240 may be configured to receive the processed image data for transmission via the antenna 1242.

In a particular embodiment, the signal processor 1210, the display controller 1226, the memory 1232, the CODEC 1234, the wireless interface 1240, and the camera interface 1268 are included in a system-in-package or system-on-chip device 1222. In a particular embodiment, an input device 1230 and a power supply 1244 are coupled to the system-on-chip device 1222. Moreover, in a particular embodiment, as illustrated in FIG. 12, the display device 1228, the input device 1230, the speaker 1236, the microphone 1238, the wireless antenna 1242, the video camera 1270, and the power supply 1244 are external to the system-on-chip device 1222. However, each of the display device 1228, the input device 1230, the speaker 1236, the microphone 1238, the wireless antenna 1242, the video camera 1270, and the power supply 1244 can be coupled to a component of the system-on-chip device 1222, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of generating a high dynamic range digital image, comprising:
   determining a first exposure setting;
   capturing a first image of a scene from a at least one sensor, based on the first exposure setting;
   determining a bright threshold;
   determining one or more bright regions of the first image based on the bright threshold;
   filtering first pixels in the one or more bright regions based on each pixel's distance to a set of reference points;
   selecting a first reference point based at least on a shutter speed and an aperture used to capture the first image if a number of filtered first pixels is below a filtered pixels threshold, but if the number of filtered first pixels is greater than the filtered pixels threshold, determining a composite point based on the filtered first pixels, and selecting the first reference point based on the reference point's distance to the composite point;
   white balancing the first image based on the selected first reference point;
   determining a second exposure setting;
   capturing a second image of the scene from the at least one sensor using the second exposure setting;
   determining a dark threshold;
   determining one or more dark regions of the second image based on the dark threshold;
   filtering second pixels in the one or more dark regions based on each pixel's distance to a set of reference points;
   selecting a second reference point based at least on a shutter speed and an aperture used to capture the second image if a number of filtered second pixels is below the filtered pixels threshold, but if the number of filtered second pixels is greater than the filtered pixels threshold, determining a composite point based on the filtered second pixels, and selecting the second reference point based on the reference point's distance to the composite point;
   white balancing the second image based on the selected second reference point; and
   generating a high dynamic range digital image by combining the white balanced first image and the white balanced second image.

2. The method of claim 1, wherein the high dynamic range digital image is generated by combining at least the bright region of the first image with the dark region of the second image.

3. The method of claim 1, wherein the white balance of the first image is also determined based on the first exposure setting or the white balance of the second image is also determined based on the second exposure setting.

4. The method of claim 1, wherein the high dynamic range digital image includes the white balance as applied to the bright region of the first image and the white balance as applied to the dark region of the second image.

5. The method of claim 1, wherein the first exposure setting is determined by:
   creating a first luminance histogram of the first image;
   determining a threshold from the first luminance histogram; and
   determining the bright region based on the threshold.

6. The method of claim 1, wherein the at least one sensor is one sensor.

7. The method of claim 1, wherein the at least one sensor is two sensors, and the first image is captured from a first sensor and the second image is captured from a second sensor.

8. The method of claim 1, wherein the final image is a snapshot.

9. The method of claim 1, wherein the final image is one frame of a video.

10. The method of claim 1, wherein the steps are performed repetitively.

11. An imaging device, comprising:
    at least one camera sensor;
    a processor, configured to perform operations to:
       determine a first exposure setting;
       capture a first image of a scene from a at least one camera sensor using the first exposure setting;
       determine a bright threshold;
       determine one or more bright regions of the first image based on the bright threshold;
       filter first pixels in the one or more bright regions based on each pixel's distance to a set of reference points;
       select a first reference point based at least on a shutter speed and an aperture used to capture the first image if a number of filtered first pixels is below a filtered pixels threshold, wherein if the number of filtered first pixels is greater than the filtered pixels threshold, determining a composite point based on the filtered first pixels, and selecting the first reference point based on the first reference point's distance to the composite point;
       white balance the first image based on the selected first reference point,
       determine a second exposure setting;
       capture a second image of the scene from the at least one-camera sensor, using the second exposure setting
       determine a dark threshold;
       determine one or more dark regions of the second image based on the dark threshold;
       filter second pixels in the one or more dark regions based on each pixel's distance to a set of reference points;
       select a second reference point based at least on a shutter speed and an aperture used to capture the second image if a number of filtered second pixels is below the filtered pixels threshold, wherein if the number of filtered second pixels is greater than the filtered pixels threshold, determine a second composite point based on the filtered second pixels, and select the second reference point based on the second reference point's distance to the second composite point;
       white balance the second image based on the selected second reference point, and
       combine the white balanced first image and the white balanced second image to produce a final image; and
    a storage for storing the final image.

12. The device of claim 11, wherein the first exposure setting is determined by:
    creating a first luminance histogram of the first image;
    determining a threshold from the first luminance histogram; and
    determining the bright region based on the threshold.

13. The device of claim 11, further comprising:
    a second camera sensor, wherein the at least one sensor is two sensors, comprising the first camera sensor and the second camera sensor.

14. The device of claim 11, wherein the final image is a snapshot.

15. The device of claim 11, wherein the processor is configured to perform the operations repetitively.

16. The device of claim 11, wherein the processor is further configured to conditionally determine a white balance of the first region based on the first exposure setting and to conditionally determine a white balance of the second region based on the second exposure setting.

17. A non-transitory computer-readable medium containing processor executable first instructions that are operative to cause a processor to
determine a first exposure setting;
capture a first image of a scene from a at least one sensor, wherein the first image is captured using the first exposure setting;
determine a bright threshold;
determine one or more bright regions of the first image based on the bright threshold;
filtering first pixels in the one or more bright regions based on each pixel's distance to a set of reference points;
select a first reference point based at least on a shutter speed and an aperture used to capture the first image if a number of filtered first pixels is below a filtered pixels threshold, but if the number of filtered first pixels is greater than the filtered pixels threshold, determine a composite point based on the filtered first pixels, and select the first reference point based on the reference point's distance to the composite point;
white balance the first image based on the selected first reference point;
determine a second exposure setting;
capture a second image of the scene from the at least one sensor using the second exposure setting;
determine a dark threshold;
determine one or more dark regions of the second image based on the dark threshold;
filter second pixels in the one or more dark regions based on each pixel's distance to a set of reference points;
select a second reference point based at least on a shutter speed and an aperture used to capture the second image if a number of filtered second pixels is below the filtered pixels threshold, but if the number of filtered second pixels is greater than the filtered pixels threshold, determine a second composite point based on the filtered second pixels, and select the second reference point based on the second reference point's distance to the second composite point;
white balance the second image based on the selected second reference point; and
combine the white balanced first image and the white balanced second image to produce a final image.

18. The computer-readable medium of claim 17, wherein the first exposure setting is determined by:
creating a first luminance histogram of the first image;
identifying a light threshold from the first luminance histogram; and
determining the bright region based on the light threshold.

19. The computer-readable medium of claim 17, also including second instructions operative to cause the processor to execute the first instructions repetitively.

20. An imaging apparatus comprising:
means for capturing a first image of a scene from a at least one sensor using the first exposure setting;
means for determining a bright threshold;
means for determining one or more bright regions of the first image based on the bright threshold;
means for filtering first pixels in the one or more bright regions based on each pixel's distance to a set of reference points;
means for selecting a first reference point based at least on a shutter speed and an aperture used to capture the first image if a number of filtered first pixels is below a filtered pixels threshold;
means for determining a composite point based on the filtered first pixels if the number of filtered first pixels is greater than the filtered pixels threshold;
means for selecting the first reference point based on the first reference point's distance to the composite point if the number of filtered first pixels is greater than the filtered pixels threshold;
means for white balancing the first image based on the selected first reference point;
means for determining a second exposure setting;
means for capturing a second image of the scene from the at least one sensor using the second exposure setting;
means for determining a dark threshold;
means for determining one or more dark regions of the second image based on the dark threshold;
means for filtering second pixels in the one or more dark regions based on each pixel's distance to a set of reference points;
means for selecting a second reference point based at least on a shutter speed and an aperture used to capture the second image if a number of filtered second pixels is below the filtered pixels threshold;
means for determining a second composite point based on the filtered second pixels if the number of filtered second pixels is greater than the filtered pixels threshold;
means for selecting the second reference point based on the second reference point's distance to the second composite point if the number of filtered second pixels is greater than the filtered pixels threshold;
means for white balancing the second image based on the selected second reference point; and
means for generating a high dynamic range digital image by combining the white balanced first image and the white balanced second image.

21. The method of claim 1, wherein determining the dark threshold comprises determining a proportion of pixel values below a predetermined level.

22. The method of claim 1, wherein determining the one or more dark regions comprises determining one or more regions with an average brightness lower than or equal to the dark threshold.

23. The method of claim 1, wherein determining the one or more bright regions comprises determining one or more regions with an average brightness greater than or equal to the bright threshold.

24. The method of claim 1, wherein the white balance of the first image is not based on the dark regions and the white balance of the second image is not based on the bright regions.

25. The method of claim 1, wherein the first pixels are filtered based on each first pixel's shortest distance to the set of reference points.

26. The method of claim 25, wherein the set of reference points comprises one or more of horizon, incandescent, TL84, cool white, D65, and shade.

27. The method of claim 25, further comprising:
determining if the shortest distance to a set of reference points for each first pixel is greater than a distance threshold;
filtering out the first pixels whose distance is greater than the distance threshold.

28. The method of claim 1, wherein determining a composite point comprises averaging red/green and blue/green ratios for the filtered first pixels.

* * * * *